United States Patent
Foth

(10) Patent No.: US 7,925,588 B2
(45) Date of Patent: Apr. 12, 2011

(54) IMAGE BASED POSITIVE PAY CHECKING SYSTEM

(75) Inventor: Thomas J. Foth, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 226 days.

(21) Appl. No.: 11/641,249

(22) Filed: Dec. 19, 2006

(65) Prior Publication Data

US 2007/0271183 A1 Nov. 22, 2007

Related U.S. Application Data

(60) Provisional application No. 60/801,521, filed on May 18, 2006.

(51) Int. Cl.
*G06Q 40/00* (2006.01)

(52) U.S. Cl. ............... 705/45; 705/35; 705/38; 705/39; 705/40; 705/41; 705/42; 705/43; 705/44

(58) Field of Classification Search .............. 705/35, 705/45

See application file for complete search history.

(56) References Cited

U.S. PATENT DOCUMENTS

| | | | | |
|---|---|---|---|---|
| 6,697,512 B2* | 2/2004 | Simonoff | .................. | 382/139 |
| 2006/0282383 A1* | 12/2006 | Doran | .................. | 705/45 |
| 2007/0214086 A1* | 9/2007 | Homoki | .................. | 705/45 |

OTHER PUBLICATIONS

Pisani, Joseph "Coming Soon: take photo of checks, deposit it in bank", Thursday, Mar. 18, 2010, CNBC News Associate.*

* cited by examiner

*Primary Examiner* — Kirsten S Apple
(74) *Attorney, Agent, or Firm* — Brian A. Collins; Steven J. Shapiro; Charles R. Malandra, Jr.

(57) ABSTRACT

A method of processing a check issued by a payor includes creating a check image at a payor location, obtaining positive pay data from the image at the payor location using OCR and transmitting the positive pay data to a payor bank of the payor. Alternatively, the positive pay data may be generated by the payor bank from the check image received from the payor. The positive pay data includes at least a name of a payee of the check and a payment dollar amount of the check, but may also include one or more of a date of the check, a serial number of the check, and an account number of the account on which the check is drawn. The positive pay data is stored by the payor bank and used to detect potential fraud when the check is later presented to the bank for payment.

8 Claims, 3 Drawing Sheets

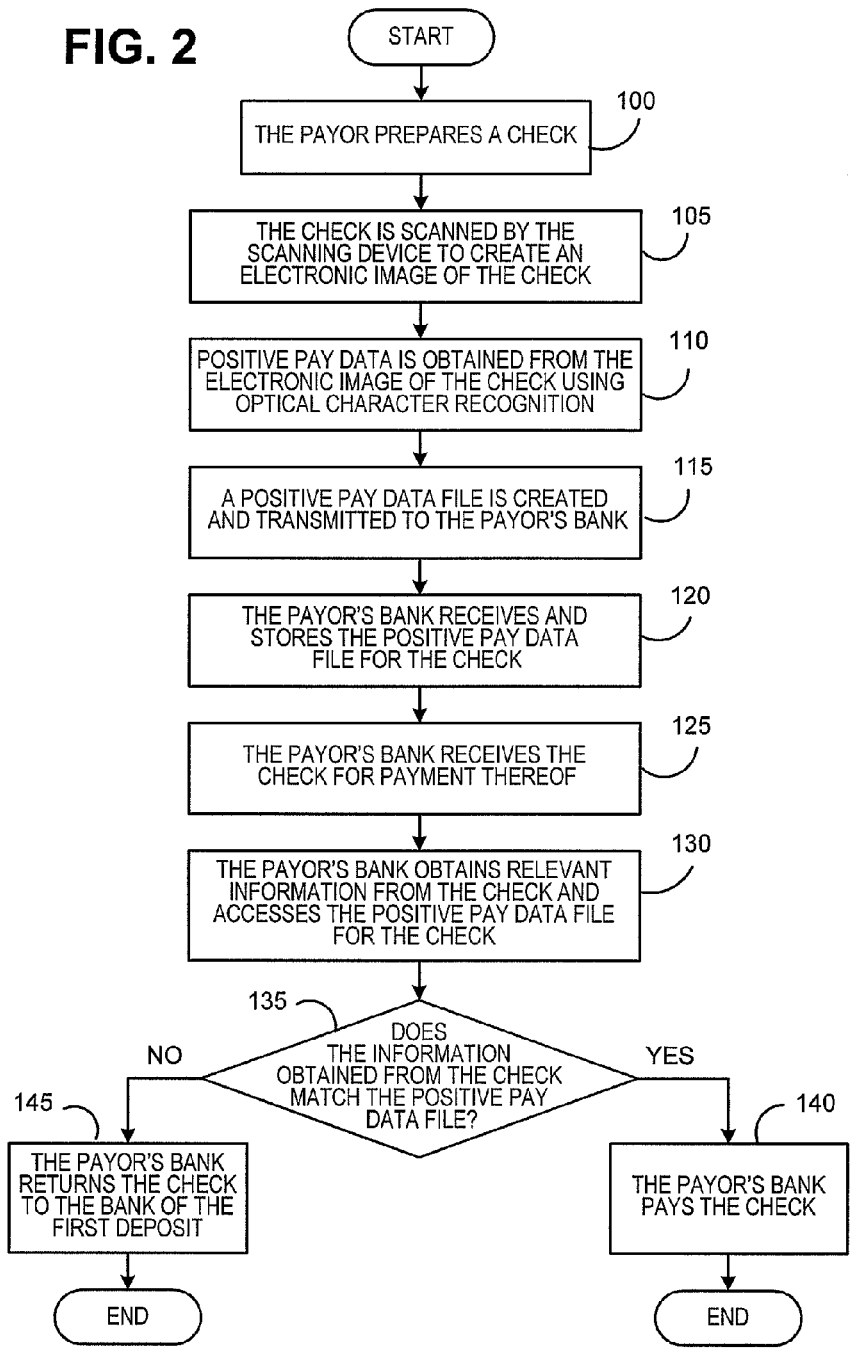

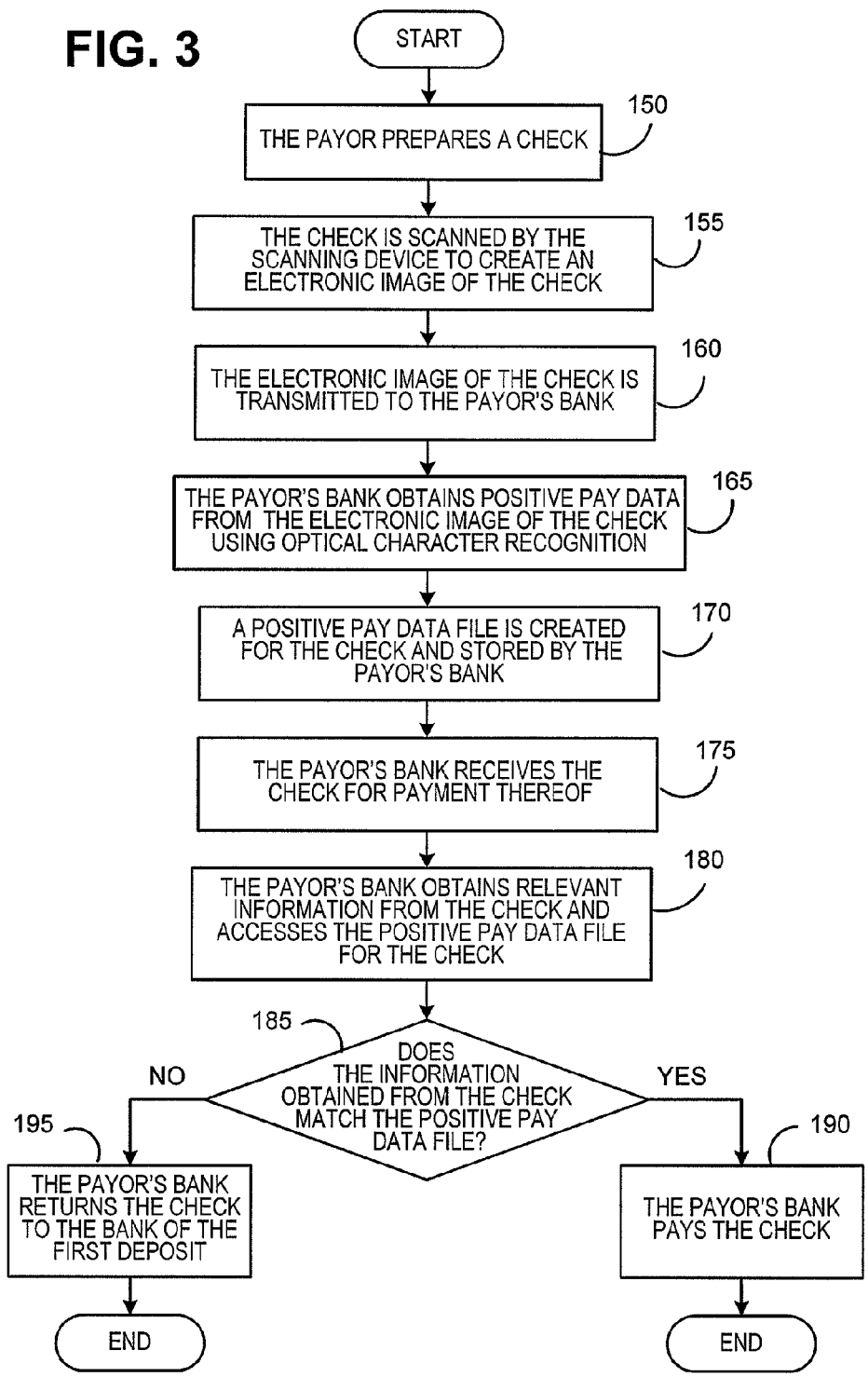

IMAGE BASED POSITIVE PAY CHECKING SYSTEM

This application claims the benefit of the filing date of U.S. Provisional Application No. 60/801,521, filed May 18, 2006, which is owned by the assignee of the present invention.

FIELD OF THE INVENTION

The present invention relates to positive pay checking systems, and in particular to an image based positive pay checking system that employs character recognition to capture relevant information from check images.

BACKGROUND OF THE INVENTION

Positive pay checking systems that protect banks and check payors from fraud are known. In a positive pay system, the check payor creates, either manually or electronically as described below, a file of information specific to each check issued by the payor that typically includes, for example, the date of the check, the check serial number, the account number of the account on which the check is drawn, the payment dollar amount of the check, and the name of the payee. The file of information for each check is then forwarded to the payor's bank. When the payor's bank receives one of the payor's checks for payment, the bank compares the information for the check previously provided by the payor in the file described above to the information on the check. If the information does not match, the payor's bank returns the check to the bank of first deposit as a potentially fraudulent check.

Most payors that issue large numbers of checks utilize computer payment systems having accounting software or the like to issue, print and account for checks. If a positive pay checking system is to be implemented in conjunction with such computer payment systems, either (i) the accounting software must be adapted or modified to create a record in a positive pay file for each check prior to printing the check, or (ii) an application must be used that reaches into the payment system's database files to create a record in the positive pay file for each check that is issued, which requires an understanding of the database schema. What this means is that checks that are created manually (i.e., by handwriting and not by a computer payment system) cannot be conveniently and/or automatically protected by a positive pay system as the information required for the positive pay file for such checks must be manually captured and entered. What this also means is that checks that are printed by a computer payment system that either (i) does not have accounting software that is able to create records in a positive pay file for each check, or (ii) does not have an open database schema, thereby preventing an application as described above (i.e., for accessing the information needed to create the positive pay file with records for each check) from being created, also cannot be conveniently protected by a positive pay system. Thus, there is a need for a positive pay checking system that addresses these problems and that allows all or nearly all checks issued by a payor to be conveniently and automatically protected.

SUMMARY OF THE INVENTION

In a first embodiment, the invention relates to a method of processing a check issued by a payor that includes creating an electronic image of the check at a payor location and obtaining positive pay data from the electronic image of the check at the payor location using optical character recognition. The positive pay data includes at least a name of a payee of the check and a payment dollar amount of the check. The method further includes transmitting the positive pay data to a bank of the payor, wherein the check is drawn on an account at the bank. The positive pay data is stored by the bank and used to detect potential fraud when the check is later presented to the bank for payment. The positive pay data may further include one or more of a date of the check, a serial number of the check, and an account number of the account on which the check is drawn.

In a second embodiment, the invention relates to a method of processing a check issued by a payor that includes creating an electronic image of the check at a payor location and transmitting the electronic image to a bank of the payor, wherein the check is drawn on an account at the bank. The method further includes obtaining positive pay data from the electronic image of the check at the bank using optical character recognition, wherein the positive pay data includes at least a name of a payee of the check and a payment dollar amount of the check. The positive pay data is stored by the bank and used to detect potential fraud when the check is presented to the bank for payment. As in the first embodiment described above, the positive pay data may further include one or more of a date of the check, a serial number of the check, and an account number of the account on which the check is drawn.

In a third embodiment, the invention relates to a method of processing a check issued by a payor and drawn on an account at a bank of the payor that includes receiving from the payor and at the bank certain positive pay data that is obtained from an electronic image of the check at a payor location using optical character recognition. The positive pay data includes at least a name of a payee of the check and a payment dollar amount of the check. The method further includes storing the positive pay data, receiving at the bank a request to make payment on the check that includes a representation of the check, obtaining check information from the representation of the check, accessing the stored positive pay data, determining whether one or more discrepancies exist between the check information and the positive pay data, and making payment on the check only if it is determined that one or more discrepancies do not exist between the check information and the positive pay data.

In a fourth embodiment, the invention relates to a method of processing a check issued by a payor and drawn on an account at a bank of the payor that includes receiving from the payor and at the bank an electronic image of the check generated at a payor location, and obtaining positive pay data from the electronic image of the check using optical character recognition. The positive pay data includes at least a name of a payee of the check and a payment dollar amount of the check. The method further includes storing the positive pay data, receiving at the bank a request to make payment on the check that includes a representation of the check, obtaining check information from the representation of the check, accessing the positive pay data, determining whether one or more discrepancies exist between the check information and the positive pay data, and making payment on the check only if it is determined that one or more discrepancies do not exist between the check information and the positive pay data.

In either the third or fourth embodiment described above, the method may further include returning the check to a bank of first deposit of the check if it is determined that one or more discrepancies do exist between the check information and the positive pay data. In addition, the representation of the check may be the check in physical form or a second electronic image of the check. Also, the positive pay data may further include one or more of a date of the check, a serial number of the check, and an account number of the account on which the check is drawn. Similarly, the check information may include a name of a payee indicated on the representation of the check, a payment dollar amount indicated on the representation of the check, a date indicated on the representation of the check, a serial number indicated on the representation of the check, and an account number indicated on the representation of the check.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

FIG. 2 is a flowchart of a first method of implementing an image based positive pay checking system according to an embodiment of the present invention; and FIG. 3 is a flowchart of a second method of implementing an image based positive pay checking system according to another embodiment of the present invention.

DESCRIPTION OF THE PREFERRED EMBODIMENTS

Figure 1:
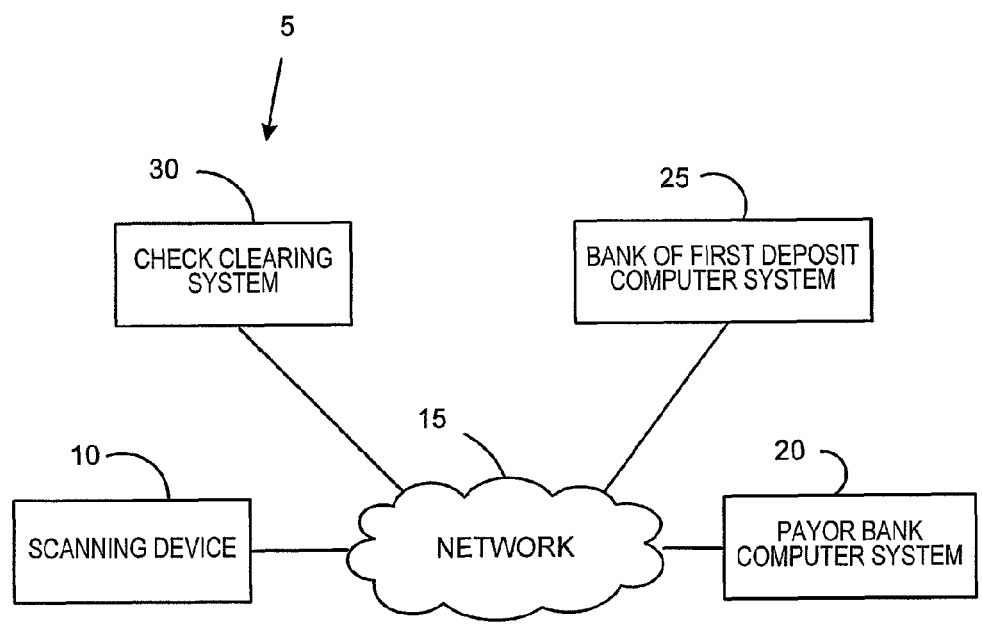
FIG. 1 is a block diagram of a system for implementing an image based positive pay checking system that employs character recognition to capture relevant information from check images according to one embodiment of the present invention.

FIG. 1 is a block diagram of a system 5 for implementing an image based positive pay checking system according to one embodiment of the present invention. The system 5 includes a scanning device 10 that is provided at a location of a payor that issues checks to be drawn on an account maintained at a payor bank. The scanning device 10 preferably includes a processing unit, a memory and a digital scanner that is able to create electronic images of checks that are scanned with the scanning device 10. The scanning device 10 is also specifically designed or adapted, typically through software provided therewith, to provide the functionality described herein. For that purpose, the scanning device 10 is provided with optical character recognition software that is able to obtain from an electronic image of a check certain information that is provided thereon (described in greater detail herein). A number of suitable scanning devices (that may be adapted as described herein) are known and are commercially available and may include, for example, the TS220E scanner sold by Digital Check Corporation of Northfield, Ill.

The scanning device 10 is in secure electronic communication with a network 15, which may be, for example, the Internet, or one or more private computer networks, or any combination thereof. The system further includes a payor bank computer system 20 that is in electronic communication with the network 15. The payor bank computer system 20 is operated by or under the direction of the payor's bank and is adapted to implement the image based positive pay checking system as described herein. Also included as part of the system 5 is a bank of first deposit computer system 25 and a check clearing system 30, both of which are secure in electronic communication with the network 15. The bank of first deposit computer system 25 is a system that is operated by or under the direction of a bank of first deposit of a check that was issued by the payor (i.e., the payor that operates the scanning device 10). As is known in the art, the check clearing system 30 is a system that exists for purposes of and that is responsible for moving checks, either in physical form or in the form of images thereof, from the depository institution at which they are deposited back to the institution on which they are written. Thus, a check that is deposited with a bank of first deposit associated with the bank of first deposit computer system 25 shown in FIG. 1 may be cleared either by physically transferring it from the bank of first deposit to the check clearing system 30 and then onto the payor bank or, alternatively, by transmitting an image of the check from the bank of first deposit computer system 25 to the check clearing system 30 and then ultimately to the payor bank computer system 20 through the network 15.

FIG. 2 is a flowchart of a first method of implementing an image-based positive pay checking system according to one embodiment of the present invention. The method begins at step 100, wherein the payor prepares a check to be paid to a payee. Next, at step 105, the payor scans the check using the scanning device 10 to create an electronic image of the check. At step 110, the scanning device 10 obtains certain positive pay data from the electronic image of the check using optical character recognition. The positive pay data preferably includes some combination of one or more of the date of the check, the check serial number, the account number of the account on which the check is drawn, the payment dollar amount of the check, and the name of the payee. Most preferably, the positive pay data includes at least the payment dollar amount of the check, and the name of the payee. As will be appreciated, the examples provided herein are intended to be exemplary and not limiting, and thus the positive pay data that is obtained may include additional relevant information that is obtained from the check. Next, at step 115, a positive pay data file that includes the positive pay data that was obtained in step 110 is created by the scanning device 10 and is transmitted to the payor bank computer system 20 through the network 15.

At step 120, the payor bank computer system 20 receives the positive pay data file for the check and stores the positive pay data file for later use as described herein. Next, at some later time, as shown in step 125, the payor's bank receives a representation of the check for payment thereof. In particular, the payor's bank will either receive the check in physical form from the bank of first deposit through the check clearing system 30 or, alternatively, may receive an image of the check at the payor bank computer system 20 from the bank of first deposit computer system 25 through the check clearing system 30 (via the network 15). Next, at step 130, the payor bank computer system 20 obtains relevant information from the check. In particular, the relevant information that is obtained includes information that, at least in part, corresponds to the positive pay data that was received from the scanning device 10 as described herein. Preferably, the payor bank computer system 20 obtains the relevant information using optical character recognition performed on either the physical check or the electronic image of the check that is received. In the most preferred embodiment, the relevant information that is obtained from the check is the same information that is included in the positive pay data file. In addition, also at step 130, the payor bank computer system 20 accesses the positive pay data file for the check from storage. Then, at step 135, a determination is made as to whether the information obtained from the check matches the positive pay data file information. In other words, a determination is made as to whether there are one or more discrepancies in these two pieces of information. If the answer at step 135 is yes, meaning that the information matches and there are no discrepancies, then, at step 140, the payor bank computer system 20 causes the check to be paid, and the method ends. If, however, the answer at step 135 is no, meaning there are one or more discrepancies between the compared items of information (e.g., the payment dollar amount included in the positive pay data file does not match the payment dollar amount obtained from the check that was presented for payment), then, at step 145, the payor's bank returns the check to the bank of first deposit as a potentially fraudulent check. Thus, the method shown in FIG. 2 allows any check that is issued by the payor to be conveniently and easily protected by a positive pay system regardless of whether the check was created by a computer payment system and also regardless of whether the computer payment system is able to extract data that would be relevant to a positive pay checking system as described elsewhere herein.

FIG. 3 is a flowchart that illustrates a second method for implementing an image-based positive pay checking system according to another embodiment of the invention. In this embodiment, instead of the positive pay data file being generated by the scanning device 10 locally at the payor location, the positive pay data file is generated by the payor bank computer system 20 at a location remote from the payor location. The method in FIG. 3 begins at step 150, wherein the payor prepares a check to be paid to a payee. Next, at step 155, the check is scanned by the scanning device 10 to create an electronic image of the check. Then, at step 160, the electronic image of the check is transmitted to the payor bank computer system 20 through the network 15.

At step 165, the payor bank computer system 20 obtains positive pay data (as described in connection with FIG. 2) from the electronic image of the check using optical character recognition. Next, at step 170, a positive pay data file is created for the check and stored by the payor bank computer system 20 for later use as described herein. Sometime later, as shown in step 175, the payor's bank receives a representation of the check for payment thereof. In particular, the payor's bank will either receive the check in physical form from the bank of first deposit through the check clearing system 30 or, alternatively, may receive an image of the check at the payor bank computer system 20 from the bank of first deposit computer system 25 through the check clearing system 30 (via the network 15). Next, at step 180, the payor bank computer system 20 obtains relevant information from the check. In particular, the relevant information that is obtained includes information that, at least in part, corresponds to the positive pay data that was created in step 170. Preferably, the payor bank computer system 20 obtains the relevant information using optical character recognition performed on either the physical check or the electronic image of the check that is received. In the most preferred embodiment, the relevant information that is obtained from the check is the same information that is included in the positive pay data file. In addition, also at step 180, the payor bank computer system 20 accesses the positive pay data file for the check from storage. Then, at step 185, a determination is made as to whether the information obtained form the check matches the positive pay data file information. In other words, a determination is made as to whether there are one or more discrepancies in these two pieces of information. If the answer at step 185 is yes, meaning that the information matches and there are no discrepancies, then, at step 190, the payor bank computer system 20 causes the check to be paid, and the method ends. If, however, the answer at step 185 is no, meaning there are one or more discrepancies between the compared items of information (e.g., the payment dollar amount included in the positive pay data file does not match the payment dollar amount obtained from the check that was presented for payment), then, at step 195, the payor's bank returns the check to the bank of first deposit as a potentially fraudulent check. Thus, similar to the method shown in FIG. 2, the method shown in FIG. 3 allows any check that is issued by the payor to be conveniently and easily protected by a positive pay system regardless of whether the check was created by a computer payment system and also regardless of whether the computer payment system is able to extract data that would be relevant to a positive pay checking system as described elsewhere herein.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of processing a check issued by a payor and drawn on an account at a bank of said payor, comprising:
   utilizing a check scanning device at a payor location to scan said check and electronically transmit an image of said check;
   receiving electronically from said payor and at said bank an electronic image of said check generated by said check scanning device at the payor location;
   creating electronically positive pay file from said electronic image of said check using optical character recognition, said positive pay file including at least a name of a payee of said check and a payment dollar amount of said check;
   storing electronically said positive pay file;
   receiving electronically at said bank a request to make payment on said check, said request including a representation of said check;
   obtaining check information from said representation of said check; from a payee;
   accessing said positive pay file;
   determining whether one or more discrepancies exist between said check information and said positive pay file; and
   making electronically payment on said check only if it is determined that one or more discrepancies do not exist between said check information and said positive pay file.

2. The method according to claim 1, further comprising returning said check to a bank of first deposit of said check if it is determined that one or more discrepancies do exist between said check information and said positive pay file.

3. The method according to claim 1, wherein said representation of said check is said check in physical form.

4. The method according to claim 1, wherein said representation of said check is a second electronic image of said check.

5. The method according to claim 1, wherein said positive pay data further includes one or more of a date of said check, a serial number of said check, and an account number of said account on which said check is drawn.

6. The method according to claim 1, wherein said check information is obtained from said representation of said check using optical character recognition.

7. The method according to claim 1, wherein said check information includes a name of a payee indicated on said representation of said check and a payment dollar amount of indicated on said representation of said check.

8. The method according to claim 5, wherein said check information includes a name of a payee indicated on said representation of said check, a payment dollar amount of indicated on said representation of said check, a date indicated on said representation of said check, a serial number indicated on said representation of said check, and an account number indicated on said representation of said check.

* * * * *